United States Patent
Gallo et al.

(10) Patent No.: US 8,750,514 B2
(45) Date of Patent: Jun. 10, 2014

(54) SECURE SMART POSTER

(75) Inventors: Francesco Gallo, Graz (AT); Christian Michael Lesjak, Semriach (AT)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 13/358,362

(22) Filed: Jan. 25, 2012

(65) Prior Publication Data

US 2012/0207305 A1 Aug. 16, 2012

(30) Foreign Application Priority Data

Feb. 10, 2011 (EP) .................................. 11154072

(51) Int. Cl.
| H04K 1/00 | (2006.01) |
| G06F 15/16 | (2006.01) |
| G06F 7/04 | (2006.01) |
| G06F 17/30 | (2006.01) |
| H04L 29/06 | (2006.01) |

(52) U.S. Cl.
USPC ................... 380/271; 380/270; 726/2; 726/3; 726/4; 726/26; 726/27; 726/30; 709/219

(58) Field of Classification Search
CPC ......... G02F 21/00; G02F 21/10; H04L 61/00; H04L 63/0853
USPC ................... 380/270–271; 709/219; 726/2–4, 726/26–27, 30
See application file for complete search history.

(56) References Cited

U.S. PATENT DOCUMENTS

| 2005/0064867 | A1 | 3/2005 | Nitta |
| 2006/0287976 | A1 | 12/2006 | Sakata |
| 2008/0132167 | A1* | 6/2008 | Bent et al. ..................... 455/41.2 |
| 2008/0192932 | A1 | 8/2008 | Graeber et al. |

(Continued)

FOREIGN PATENT DOCUMENTS

| CN | 1363065 A | 8/2002 |
| CN | 101180639 A | 5/2008 |
| CN | 101321311 A | 12/2008 |
| CN | 101582151 A | 11/2009 |

OTHER PUBLICATIONS

"Near Field Communication, The Next Experience in Mobile, (NFC)", 1 pg., retrieved from the Internet at: http://www.nxp.com/nfc (Jan. 17, 2012).

(Continued)

Primary Examiner — Joseph P. Hirl
Assistant Examiner — Kalish Bell

(57) ABSTRACT

A smart poster system is provided, which includes a smart poster comprising an NFC device, a mobile device for communicating with the NFC device, and a server unit for providing content to the mobile device, wherein the NFC device is arranged to provide the mobile device with an address of the server unit, the address comprising a counter value, which counter value represents the number of executed read accesses to the NFC device. Also, a method for providing a secure communication channel between a mobile device and a server unit in a smart poster system is conceived, wherein the smart poster system comprises an NFC device for providing the mobile device with an address of the server unit, and wherein the NFC device, upon generating the address, incorporates a counter value into the address, the counter value representing the number of executed read accesses to the NFC device. Thereby, the authenticity of both the NFC device and the server unit is ensured.

12 Claims, 2 Drawing Sheets

(56) References Cited

U.S. PATENT DOCUMENTS

| | | | |
|---|---|---|---|
| 2008/0248749 A1* | 10/2008 | Bahl et al. | 455/41.2 |
| 2009/0235347 A1* | 9/2009 | Syed et al. | 726/10 |
| 2010/0004988 A1 | 1/2010 | Matsuo | |
| 2010/0071072 A1* | 3/2010 | Holland et al. | 726/27 |
| 2010/0161410 A1* | 6/2010 | Tulloch | 705/14.45 |
| 2011/0047209 A1* | 2/2011 | Lindholm et al. | 709/203 |

OTHER PUBLICATIONS

"NFC Forum, Smart Poster Record Type Definition, Technical Specification, NFC Forum™, SPR 1.1, NFCForum-SmartPoster_RTD_1.0", 15 pgs., retrieved from the Internet at: http://www.nfc-forum.org/specs (Jul. 24, 2006).

"NFC Forum, Type Tags, White Paper V1.0, NXP Semiconductors—Public", 24 pgs., retrieved from the Internet at: http://www.nfc-forum.org/resources/white_papers/NXP_BV_Type_Tags_White_Paper-Apr_09 (Apr. 1, 2009).

"NFC Forum, Signature Record Type Definition, Technical Specification, NFC Forum™, Signature 1.0, NFCForum-TS-Signature_RTD-1.0", 18 pgs., retrieved from the Internet at: http://www.nfc-forum.org (Nov. 18, 2010).

"NFC Forum, Text Record Type Definition, Technical Specification, NFC Forum™, RTD-Text 1.0, NFCForum-TS-RTD_Text_1.0", 10 pgs., retrieved from the Internet at: www.nfc-forum.org/specs (Jul. 24, 2006).

"NFC Forum, URI Record Type Definition, Technical Specification, NFC Forum™, RTD-URI 1.0, NFCForum-TS-RTD_URL_1.0", 14 pgs., retrieved from the Internet at: www.nfc-forum.org/specs (Jul. 24, 2006).

Kilås, M. "Digital Signatures on NFC Tags", Master of Science Thesis, 53 pgs., School of Information and Communication Technology, the Royal Institute of Technology, retrieved from the Internet at: http://www.kth.se (Mar. 18, 2009).

Extended European Search Report for EP Patent Appln. No. 11154072.0 (Jun. 29, 2011).

* cited by examiner

SECURE SMART POSTER

CROSS-REFERENCE TO RELATED APPLICATIONS

This application claims the priority under 35 U.S.C. §119 of European patent application no. 11154072.0, filed on Feb. 10, 2011, the contents of which are incorporated by reference herein.

FIELD OF THE INVENTION

The invention relates to a smart poster system. The invention further relates to a method for providing a secure communication channel between a mobile device and a server unit in a smart poster system.

BACKGROUND OF THE INVENTION

Identification products, such as smart cards and RFID tags, are widely used in fields such as transport (ticketing, road tolling, baggage tagging), finance (debit and credit cards, electronic purse, merchant card), communications (SIM card for GSM phone), and tracking (access control, inventory management, asset tracking). RFID is an acronym of radio frequency identification. International standard ISO14443A is the industry standard for contactless smart cards. ISO14443A-compliant products such as MIFARE provide RF communication technology for transmitting data between a card or tag and a reader device. For example, in electronic ticketing for public transport, travelers wave their card over a reader at the turnstiles or entry point, benefiting from improved convenience and speed in the ticketing process. Such products are said to be the key to individual mobility in the future, supporting multiple applications including road tolling, airline tickets, access control and many more.

Evolving from a combination of contactless identification and networking technologies, near field communication (NFC) is a very short-range wireless technology, for distances measured in centimeters. NFC has been described on the website http://www.nxp.com/nfc and in the standard ISO/IEC 18092. NFC technology is optimized for intuitive, easy and secure communication between various devices without the need for manual configuration by a user. In order to make two devices communicate, users bring them close together or make them touch. The devices comprise NFC interfaces that will automatically connect and configure themselves to form a peer-to-peer network. NFC can also bootstrap other protocols like Bluetooth or wireless Ethernet (Wi-Fi) by exchanging configuration and session data. NFC is compatible with contactless smart card platforms. This enables NFC devices to read information from these cards, making contactless smart cards the ideal solution for bringing information and vouchers into the NFC world. NFC devices can also operate like a contactless card or tag, which makes them compatible with the existing infrastructure of ISO14443A-compliant systems.

The NFC Forum (http://www.nfc-forum.org/) is a non-profit industry association which promotes the use of NFC short-range wireless interaction in the fields of consumer electronics, mobile devices and personal computers. The NFC Forum promotes the implementation and standardization of NFC technology to ensure interoperability between devices and services.

A typical example of an NFC Forum use case is the so-called Smart Poster application. A poster or billboard may be equipped with a tag which can be touched, for example, with a mobile device, such as a mobile phone, in order to read out application data stored on the tag. The application data stored on the tag may, for example, comprise the address of the website of a concert advertized by the smart poster. In this case the mobile device may open a browser window and connect to the internet to access the website. In addition, the application data may comprise a digital signature which allows the mobile device to check the authenticity and integrity of the data.

In the terminology of the NFC Forum the tag is referred to as a NFC Forum Tag and the mobile device is referred to as a NFC Forum Device. More information about the NFC Forum Tag and the NFC Forum device can be found in the following documents, which are accessible via http://www.nfc-forum.org:

- NFC Forum Type Tags, White Paper V1.0, NXP Semiconductors, published on 1 Apr. 2009
- Smart Poster Record Type Definition, Technical Specification, NFC Forum, SPR 1.1, Jul. 24, 2006
- Signature Record Type Definition, Candidate Technical Specification, NFC Forum, NFCForum-TS-Signature_RTD-1.0_draft_14
- Text Record Type Definition, Technical Specification, NFC Forum, RTD-Text 1.0, Jul. 24, 2006
- URI Record Type Definition, Technical Specification, NFC Forum, RTD-URI 1.0, Jul. 24, 2006

The use of digital signatures on NFC tags in order to ensure authenticity and integrity of data has been discussed in the paper "Digital Signatures on NFC Tags", a Master of Science Thesis from Markus Kiås, School of Information and Communication Technology from the Royal Institute of Technology in Stockholm, published on 18 Mar. 2009 and accessible via http://www.kth.se/. In particular, this paper evaluates the feasibility of digital signatures on NFC tags.

US 2010/161410 (A1), entitled "Smart Poster" and published on 24 Jun. 2010, discloses that content downloadable from a smart poster is managed remotely at a server. The content data is monitored and usage data of the smart poster is analyzed at the server via an NFC-enabled telecommunications device that is mounted behind a touch point of the smart poster. For this purpose a processor is provided which is arranged to communicate details of transactions between the NFC-enabled telecommunications device and a mobile device to the remote server via a network. The logging of transactions between the smart poster and the mobile device allows the usage of the smart poster to be monitored, in that, for example, the server may be arranged to interrogate the processor and to generate an alarm signal if a response other than the expected response is received. In this way tampering with the NFC-enabled device can be detected. However, there still exists a need to improve the security of use of smart poster applications of the kind set forth.

SUMMARY OF THE INVENTION

It is an object of the invention to improve the security of use of smart poster applications of the kind set forth. This is achieved by a smart poster system in accordance with claim 1 and by a method for providing a secure communication channel between a mobile device and a server unit in a smart poster system, in accordance with claim 8.

According to an aspect of the invention a smart poster system is provided, which includes a smart poster comprising an NFC device, a mobile device for communicating with the NFC device, and a server unit for providing content to the mobile device, wherein the NFC device is arranged to provide the mobile device with an address of the server unit, the address comprising a counter value, which counter value represents the number of executed read accesses to the NFC device. In this way the address of the server unit is no longer static, but includes a parameter which changes during use of the tag. This prevents undesired reuse of the address by copying it to another NFC device, for example.

According to another aspect of the invention the address further comprises an identifier value of the NFC device.

According to yet another aspect of the invention the address further comprises a message authentication code calculated over the counter value and the identifier value of the NFC device. In this way, it is ensured that each read of the NFC device by a mobile device yields a unique address for accessing content on the server unit.

According to yet another aspect of the invention, the server unit is a remote server on the internet and the address is an internet address represented by a uniform resource locator.

According to yet another aspect of the invention, the address is signed with a digital signature.

According to yet another aspect of the invention, the NFC device is arranged to prevent further read access to its data if the counter value has reached a predetermined threshold. In this way the number of accesses to content on the server unit can be limited in a relatively simple way.

According to yet another aspect of the invention, the mobile device is arranged to verify the authenticity of the server unit by hashing an encrypted counter value received from the server unit, comparing the hashed encrypted counter value received from the server unit with a hashed encrypted counter value received from the NFC device, and if the encrypted counter value received from the server unit is equal to the encrypted counter value received by the NFC device, concluding that the server unit is authentic, and otherwise, that the server unit is not authentic.

According to an aspect of the invention a method for providing a secure communication channel between a mobile device and a server unit in a smart poster system is conceived, wherein the smart poster system comprises an NFC device for providing the mobile device with an address of the server unit, and wherein the NFC device, upon generating the address, incorporates a counter value into the address, the counter value representing the number of executed read accesses to the NFC device. In this way the address of the server unit is no longer static, but includes a parameter which changes during use of the tag. This prevents undesired reuse of the address by copying it to another NFC device, for example.

According to another aspect of the invention, the NFC device further incorporates an identifier value of the NFC device into the address.

According to yet another aspect of the invention, the NFC device further incorporates a message authentication code calculated over the counter value and the identifier value of the NFC device into the address. In this way, it is ensured that each read of the NFC device by a mobile device yields a unique address for accessing content on the server unit.

According to yet another aspect of the invention, the server unit is a remote server on the internet and the address is an internet address represented by a uniform resource locator.

According to yet another aspect of the invention, the NFC device signs the address with a digital signature.

According to yet another aspect of the invention, the NFC device prevents further read access to its data if the counter value has reached a predetermined threshold. In this way the number of accesses to content on the server unit can be limited in a relatively simple way.

According to yet another aspect of the invention, the mobile device verifies the authenticity of the server unit by hashing an encrypted counter value received from the server unit, comparing the hashed encrypted counter value received from the server unit with a hashed encrypted counter value received from the NFC device, and if the encrypted counter value received from the server unit is equal to the encrypted counter value received by the NFC device, concluding that the server unit is authentic, and otherwise, that the server unit is not authentic.

BRIEF DESCRIPTION OF THE DRAWINGS

The invention will be described in more detail with reference to the appended drawings, in which.

DESCRIPTION OF PREFERRED EMBODIMENTS

Figure 1:
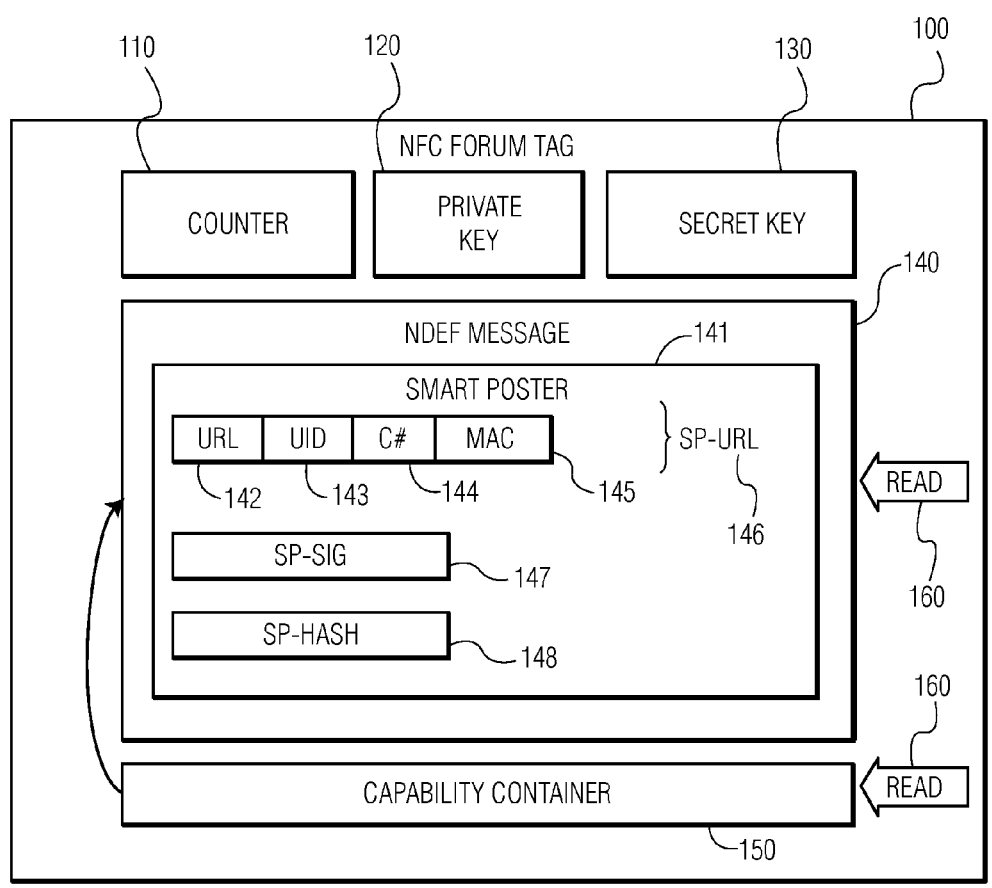
FIG. 1 shows an embodiment of an NFC device in accordance with the invention.

FIG. 1 shows an embodiment of an NFC device in accordance with the invention. According to this embodiment, the NFC device is the NFC Forum Tag 100 as specified by the NFC Forum. The NFC Forum Tag comprises a counter 110 which is incremented on certain events, for example the NFC Forum Tag selection and Capability Container 150 read events 160, as specified by the NFC Forum. The NFC Forum Tag further comprises a private key 120 for signing the address SP-URL 146 of the server unit and a secret key 130 shared with the server unit to generate the message authentication code MAC of the counter value C# and the identifier value UID of the NFC Forum Tag.

The NFC Forum Tag also comprises a NFC Data Exchange Format (NDEF) message. The mandatory NDEF message 140 contains NFC Smart Poster 141 data with the following records:

SP-URL 146 (Smart Poster Uniform Resource Locator), i.e. a record of the type "U" according to the NFC Record Type Definition, which points to the server unit on the internet, and which incorporates, as parameters of the URL 142, the NFC Forum Tag's identifier value UID 143 and the current counter value C#144, as well as a message authentication code MAC 145;

SP-SIG 147 (Smart Poster Signature), i.e. a record of the type "Sig", to sign SP-URL;

SP-HASH 148, a hash value generated by hashing the encrypted counter value.

Figure 2:
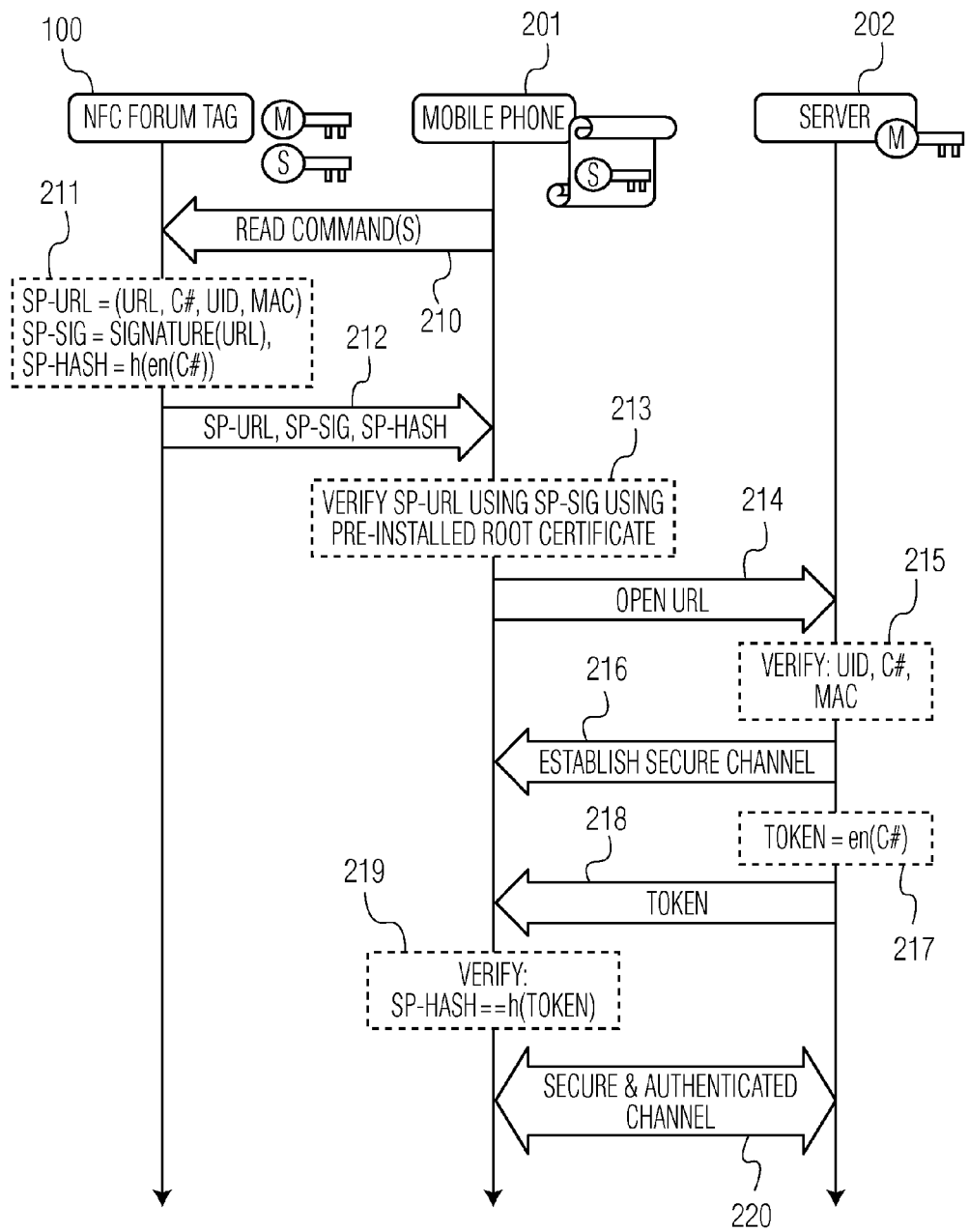
FIG. 2 illustrates a process of reading an NFC device in order to establish a secure and authenticated communication channel between a mobile device and a server unit in a smart poster system according to the invention.

FIG. 2 illustrates a process of reading an NFC device (in this example the NFC Forum Tag 100) in order to establish a secure and authenticated communication channel between a mobile device 201 and a server unit 202 in a smart poster system according to the invention. The process comprises steps the following steps.

I. At step 210, the mobile device (in this example a mobile phone 201) sends one or more read commands to the NFC Forum Tag 100 in order to initiate a read operation. In particular, the mobile phone 201 requests to read the Smart Poster 141 data on the NFC Forum Tag 100 by using the appropriate commands.

II. At step 211, in response to the command(s), the NFC Forum Tag 100 generates the NDEF message containing the NFC Smart Poster 141 data with the following records:

a. SP-URL 146 (Smart Poster Uniform Resource Locator), i.e. a record of the type "U" according to the NFC Record Type Definition, which points at the server unit 202 on the internet, and which incorporates, as parameters of the URL 142, the NFC Forum Tag's identifier value UID 143 and the current counter value C#144, as well as a message authentication code MAC 145;

b. SP-SIG 147 (Smart Poster Signature), i.e. a record of the type "Sig", to sign SP-URL;

c. SP-HASH 148, a hash value generated by hashing the encrypted counter value.

III. At step 212, the NFC Forum Tag 100 returns the generated NDEF message to the mobile phone 201.

IV. At step 213, the mobile phone 201 verifies SP-URL 146 using SP-SIG 147 and a pre-installed root certificate. Alternatively, a certificate could be retrieved dynamically using a certificate URL. If the verification fails, the NFC Forum Tag 100 is considered to be malicious and the process stops. Otherwise, the process continues with the next step.

V. At step 214, the mobile phone 201 connects to the server unit on the internet using the verified SP-URL.

VI. At step 215, the server unit 202 receives the request and verifies it using:

a. the identifier value UID in order to check whether it can be associated with a known NFC Forum tag;

b. the counter value C# in order to check whether it is plausible, in that, for example, there is no sudden unexpected change of the counter value which would indicate malicious activity;

c. the message authentication code MAC in order to check whether the request was generated after reading an authentic and valid NFC Forum Tag 100 to ensure that the NFC Forum Tag 100 was really touched and that the request was not modified by the mobile phone 201 or an interceptor;

d. its own database in order to check whether the NFC Forum Tag 100 was already marked invalid.

If any of the checks under (a) to (d) fails, then the server unit 202 will reject the request and the process will stop. Otherwise, the process continues with the next step.

VII. The server unit 202 stores the current counter value and other metadata of the request.

VIII. At step 216, the server unit 202 and the mobile phone 201 establish a secure communication channel between each other. It will be appreciated that techniques for establishing such a channel are known per se and that the skilled person may select an appropriate one.

IX. At step 217, the server unit 202 generates an encrypted counter value TOKEN by encrypting the counter value C# using a secret key shared with the NFC Forum Tag 100.

X. At step 218, the server unit 202 sends the encrypted counter value TOKEN to the mobile phone 201 via the secure communication channel.

XI. At step 219, the mobile phone 201 generates a hash of the received encrypted counter value TOKEN and compares it with the hash value SP-HASH 148 generated by the NFC Forum Tag 100. For this purpose it uses the same hash algorithm as the NFC Forum Tag 201. Hash algorithms are known per se and need not be elaborated here. If the two hash values are different, the server unit 202 is not authentic, and the mobile phone 201 stops the communication with the server unit 202.

XII. Otherwise, at step 220, the secure and authenticated communication channel is available for use.

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SYMBOLS

SP-URL address of the server unit
UID identifier value of the NFC device
C# counter value
MAC message authentication code
SP-SIG digital signature
SP-HASH hashed encrypted counter value from the NFC device
TOKEN encrypted counter value from the server unit

The invention claimed is:

1. A smart poster system comprising:
a smart poster comprising an NFC device that further comprises a counter which is incremented on certain events;
a mobile device configured to communicate with the NFC device; and
a server unit configured to provide content to the mobile device, wherein the NFC device is configured to provide the mobile device with an address of the server unit, the address comprises a Message Authentication Code calculated over the counter value and the identifier value of the NFC device, and a counter value from the counter, and the counter value represents a number of executed read accesses to the NFC device.

2. The smart poster system as claimed in claim 1, wherein the address further comprises an identifier value of the NFC device.

3. The smart poster system as claimed in claim 1, wherein the server unit is a remote server on the internet and the address is an internet address represented by a uniform resource locator.

4. The smart poster system as claimed in claim 1, wherein the address is signed with a digital signature.

5. The smart poster system as claimed in claim 1, wherein the NFC device is arranged to prevent further read access to its data if the counter value has reached a predetermined threshold.

6. The smart poster system as claimed in claim 1, wherein the mobile device is arranged to verify the authenticity of the server unit by:
hashing an encrypted counter value received from the server unit:
comparing the hashed encrypted counter value received from the server unit with a hashed encrypted counter value received from the NFC device; and
if the encrypted counter value received from the server unit is equal to the encrypted counter value received by the NFC device, concluding that the server unit is authentic, and if the encrypted counter value received from the server unit is not equal to the encrypted counter value received by the NFC device, concluding that the server unit is not authentic.

7. A method for providing a secure communication channel between a mobile device and a server unit in a smart poster system comprising an NFC device, the method comprising:
   providing, by the NFC device, the mobile device with an address of the server unit; and
   generating, by the NFC device, the address, wherein generating comprises incorporating a Message Authentication Code calculated over the counter value and the identifier value of the NFC device, and a counter value from a counter into the address, the counter value representing the number of executed read accesses to the NFC device.

8. The method as claimed in claim 7, wherein generating further comprises:
   incorporating an identifier value of the NFC device into the address.

9. The method as claimed in claim 7, wherein the server unit is a remote server on the internet and the address is an internet address represented by a uniform resource locator.

10. The method as claimed in claim 7, further comprising: signing, by the NFC device, the address with a digital signature.

11. The method as claimed in claim 7, further comprising: preventing, by the NFC device, further read access to its data if the counter value has reached a predetermined threshold.

12. The method as claimed in claim 7, further comprising: verifying, by the mobile device, the authenticity of the server unit, wherein verifying comprises:
   hashing an encrypted counter value received from the server unit,
   comparing the hashed encrypted counter value received from the server unit with a hashed encrypted counter value received from the NFC device, and if the encrypted counter value received from the server unit is equal to the encrypted counter value received by the NFC device, concluding that the server unit is authentic, and if the encrypted counter value received from the server unit is not equal to the encrypted counter value received by the NFC device, concluding that the server unit is not authentic.

* * * * *